United States Patent [19]

Bott et al.

[11] Patent Number: 4,496,702
[45] Date of Patent: Jan. 29, 1985

[54] POLYACETYLENE PRODUCTION

[75] Inventors: David C. Bott, Woking; John H. Edwards, Stockton-on-Tees; William J. Feast, High Shincliffe, all of England

[73] Assignee: The British Petroleum Company p.l.c., London, England

[21] Appl. No.: 442,147

[22] Filed: Nov. 16, 1982

[30] Foreign Application Priority Data

Nov. 20, 1981 [GB] United Kingdom ............... 8134975

[51] Int. Cl.$^3$ ............................................ C08F 138/02
[52] U.S. Cl. .................................................... 526/285
[58] Field of Search ......................................... 526/285

[56] References Cited

U.S. PATENT DOCUMENTS

| | | | |
|---|---|---|---|
| 4,222,903 | 9/1980 | Heeger | 252/518 |
| 4,228,060 | 10/1980 | Pez | 526/285 |
| 4,277,588 | 7/1981 | Naarmann | 526/285 |
| 4,408,027 | 10/1983 | Hocker | 526/285 |
| 4,411,826 | 10/1983 | Naarmann | 526/285 |

FOREIGN PATENT DOCUMENTS 56-120715 9/1981 Japan.

OTHER PUBLICATIONS

J. H. Edwards et al., Polymer, 21, Jun. 1980, pp. 595, 596.

*Primary Examiner*—Paul R. Michl
*Attorney, Agent, or Firm*—Brooks, Haidt, Haffner & Delahunty

[57] ABSTRACT

The present invention relates to coherent poly(acetylene) films and to a method of producing such polyacetylenes. The process comprises solvent casting a solution of a polymer of the general formula (V) derived from a precursor (IV), and transforming the pre-cast, polymer (V) into a poly(acetylene) (III) film and a by-product (VI) at a temperature between 20° and 200° C. at reduced pressure. The poly(acetylene) thus formed has a substantially higher density than the poly(acetylene) polymers produced hitherto. The morphology of the poly(acetylene) produced is that of a thin, coherent solid film with no voids and, no basic structural units are visible even at a magnification of 10,000 times. The polymers also have a lower crystallinity than those produced by conventional methods.

4 Claims, 1 Drawing Figure

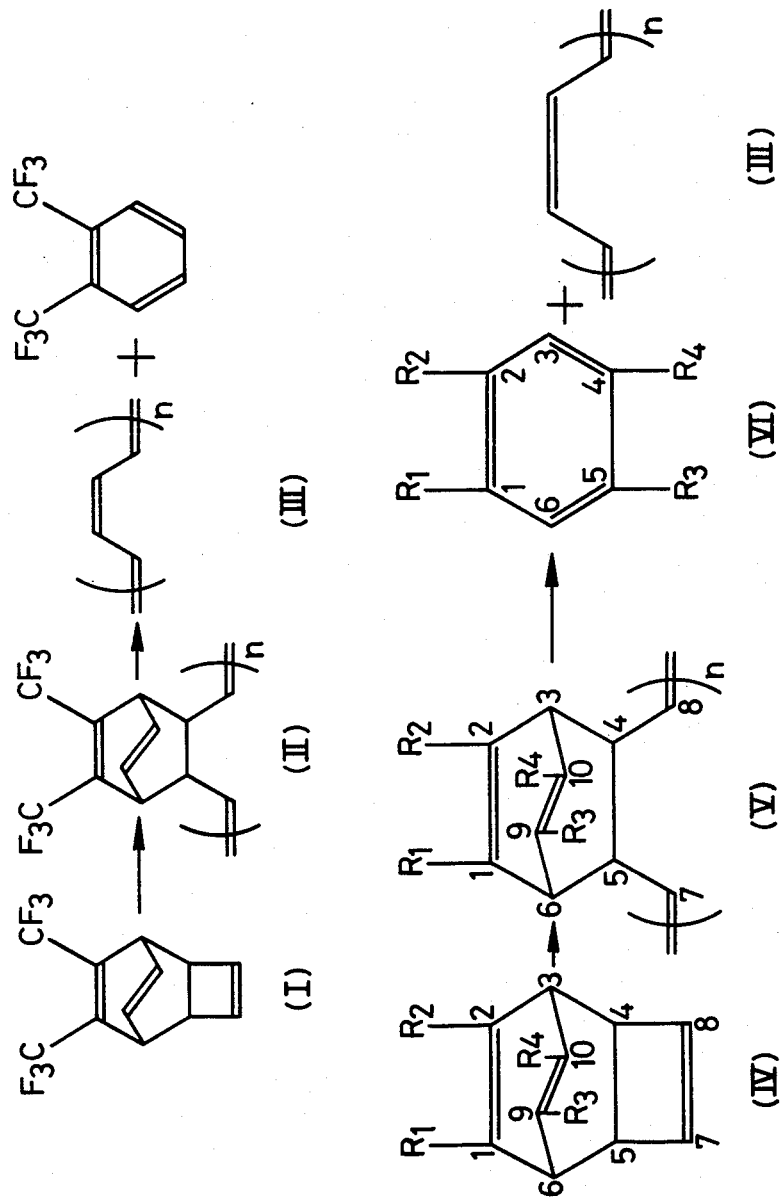

POLYACETYLENE PRODUCTION

The present invention relates to coherent poly(acetylene) films and a method of producing such polyacetylenes.

Poly(acetylene) is known to have highly desirable electrical conducting properties. Such polymers are usually produced by direct polymerisation of acetylene gas in the presence of a catalyst, eg as described by Ito et al (J. Polymer. Sci. Chem., 12, pp 11, 1974). The polymers thus produced have a relatively low density of around 0.4 g/cc and have a morphology which is an open, irregular, fibrillar structure with random orientation of the fibrils. The conductivity of such polymers has hitherto been improved by appropriate chemical doping. The morphology of polymers produced hitherto offers an advantage with respect to the speed of chemical reactions such as doping. However, due to the high surface area which is an inherent characteristic of such a morphology, the poly(acetylene) is also highly susceptible to oxidative degradation. Moreover, the open and irregular morphology of the polymer and the random orientation of the fibrils makes doping of specific areas of the film with well-defined edges, which is the basis of the semi-conductor industry, virtually impossible. Such polymers are also infusible and insoluble in conventional solvents thereby making it difficult to fabricate isotropic and anisotropic articles therefrom. There is a continuing need in industry for a poly(acetylene) which can be easily and conveniently fabricated into articles of a desired shape, and which can be fabricated to possess a degree of chain alignment. This chain alignment increases the anisotropy of electrical properties.

More recently, Edwards and Feast (Polymer, vol. 21, June 1980, pp 595) have described a method of producing poly(acetylene) (III) by first polymerising a precursor 7,8-bis(trifluoromethyl)tricyclo-[4,2,2,0$^{2,5}$]-deca3,7,9-triene (I) using a catalyst in toluene and the precursor polymer (II) so formed is spontaneously decomposed to a black product and 1,2-bis(trifluoromethyl)benzene. When the precursor polymer (II) was heated to 150° under a vacuum of 0.01 mm of mercury for 5 hours the authors obtained a product which had an infra-red and Raman spectrum corresponding to that of trans-poly(acetylene) although the elemental analysis showed that only 96.3% of the fluorine had been removed. When heated for a further 3 hours at 210° C., 98.9% of the fluorine had been removed although the polymer would probably have been degraded by this stage. The authors stated that this type of system is too labile for convenient generation of poly(acetylene) and that they are investigating related structures in order to find a more stable precursor.

It has now been found that a poly(acetylene) having a higher density and a markedly different morphology can be produced from the same or similar precursor polymers under appropriate conditions.

Accordingly, the present invention is a coherent poly(acetylene) film.

According to a further embodiment, the present invention is a process for producing a coherent poly(acetylene) (III) film comprising solvent casting a solution of a polymer of the general formula (V) derived from a precursor (IV), and transforming the pre-cast, polymer (V) into the poly(acetylene) (III) film and a by-product (VI) at a temperature between 20° and 200° C. under reduced pressure over a duration of between 1 and 100 hours in an atmosphere inert to the precursor polymer (V) and to the poly(acetylene), wherein in the general formulae IV, V and VI each of the groups $R_1$ and $R_2$ either (a) represent a radical selected from H, $CX_3$, $C_mH_{2m+1}$ and $COOR_5$ wherein X is a halogen atom, m has a value between 1 and 4 and $R_5$ is an alkyl group with 1–4 carbon atoms, or (b) form together with the respective carbon atoms to which they are attached a benzene nucleus, and each of $R_3$ and $R_4$ either (c) represent H atoms, or (d) form together with the respective carbon atoms to which they are attached to a benzene nucleus.

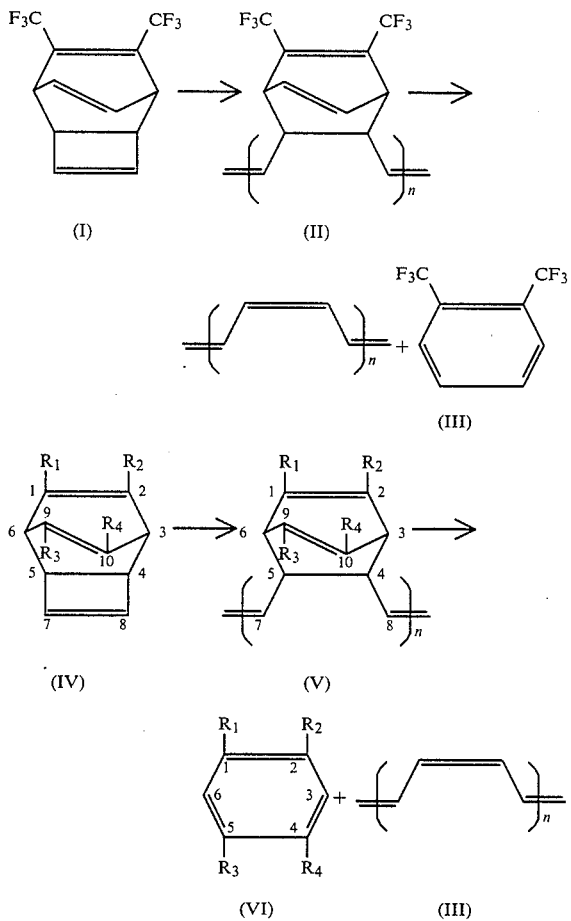

Specific examples of the groups $R_1$ and $R_2$ are a trifluoromethyl group, an alkyl group or an alkyl carboxylate group, especially a methyl carboxylate group.

More specifically the precursor (IV) may be a compound in which $R_1$ and $R_2$ are each a trifluoromethyl group, and $R_3$ and $R_4$ are each a hydrogen atom. Such a compound is shown in formula I above.

The precursor polymers (V) used in the solvent casting step may be produced by conventional means e.g. that described in the paper by Edwards and Feast referred to above. The polymerisation of the precursors (IV) is suitably carried out in the presence of a tungsten hexachloride/tetralkyl or aryl tin (1:2 w/w) or titanium tetrachloride/trialkyl or dihaloalkyl aluminium (1:2 w/w) catalyst at ambient temperatures and pressures.

Depending upon the tendency of the precursor polymer to transform to poly(acetylene), it must be stored at a temperature low enough to slow down this transformation. For example, the precursor polymer (II) is suitably stored at relatively low temperatures suitably below $-10°$ C., preferably below $-20°$ C. and typically $-26°$ C. to prevent the premature transformation thereof into poly(acetylene). At this temperature the precursor polymer of the formula (II) is stable for at least 14 months. Where $R_1$ and $R_2$ represent a benzene ring and $R_3$ and $R_4$ represent hydrogen atoms then the precursor polymer may be conveniently stored at room temperature at which temperature it is stable for at least six months.

For solvent casting, the precursor polymer (V) is preferably dissolved in an organic solvent to a concentration which, for a given depth of solution, gives the desired thickness of the required shape. This concentration is typically up to 100 g/l (approximately equivalent to eg a film thickness of up to 100 microns). The precursor polymer is suitably cast from an organic solvent selected from acetone, chloroform, ethyl acetate, toluene and xylene although solvents such as toluene and xylene are preferred for precursor polymers with aromatic substituents.

The precursor polymer (V) may be cast into any desired shape although shapes with a relatively high surface area e.g. a film or a fibre facilitate the transformation reaction. During the solvent casting process it is most desirable to minimise moisture and/or oxygen content of the system in order to produce a coherent film having the desirable properties of conductance. It is most preferable to carry out the casting in an atmosphere inert with respect to the precursor polymer (V) and the eventual polyacetylene film formed. The inert atmosphere is suitably provided by nitrogen or argon gas. The casting temperature may be suitably adjusted to control the rate of deposition of the precursor polymer from the solvent.

After casting, the temperature at which and the duration for which the precursor polymer is heated to produce the poly(acetylene) film will depend upon the nature of the substituents in the precursor polymer. For example, the precursor polymer is preferably heated at a temperature between 20° and 200° C. for between 1 and 100 hours to produce the poly(acetylene) film. The Table below illustrates the preferred ranges for various substituents in the precursor polymer.

TABLE 1

| Substituents | | | | | |
|---|---|---|---|---|---|
| $R_1$ | $R_2$ | $R_3$ | $R_4$ | Temp °C. | Time (hours) |
| H | H | H | H | 20–50 | 1–20 |
| $CF_3$ | $CF_3$ | H | H | 50–120 | 1–100 |
| $CO_2CH_3$ | $CO_2CH_3$ | H | H | 50–120 | 1–100 |
| benzene ring | | H | H | 100–150 | 1–100 |
| benzene ring | | benzene ring | | 175–200 | 1–100 |

For instance, the polymer (II) is heated at a temperature below 150° C., preferably between 50° and 120° C., under vacuum or in the presence of an inert atmosphere, e.g. nitrogen, to transform the precursor polymer (II) into a coherent poly(acetylene) film. The heating procedure may be carried out for a period between 1 and 100 hours suitably between 10 and 50 hours to form the poly(acetylene) polymer. The rate of heating is suitably between 1° and 10° C. per minute. The lower the heating temperature, the longer the duration of heating. The preferred ranges specified relate to that needed to achieve a substantially complete transformation of the precursor polymer to a coherent film. For some uses partial transformation may be adequate and hence slight variations outside the preferred ranges may be acceptable. It should be noted, however, that effort to transform the precursor polymer below 20° C. results in a creased and wrinkled film whereas at temperatures above 200° C. there is substantial degradation of the polymer and loss of coherence due to appearance of voids.

The poly(acetylene) thus formed has a substantially higher density than the poly(acetylene) polymers produced hitherto. For instance, the density of the poly(acetylene) (III) produced according to the present invention is approximately 1.0 g/cc whereas that of the poly(acetylene) produced according to the prior art methods is only about 0.4–0.5 g/cc. The calculated density of poly(acetylene) is 1.2 g/cc. The morphology of the poly(acetylene) produced according to the present invention is shown by scanning electron microscopy (SEM) to be that of a thin, coherent solid film with no voids and, no basic structural units are visible even at a magnification of 10,000 times. At such magnification poly(acetylene) produced by prior art methods reveals a clear fibrillar structure. The polymers also have a lower crystallinity than those produced by conventional methods. The resonance Raman spectra show that these poly(acetylenes) have shorter lengths of conjugated double bond in sequence than those derived by prior art processes. Typically, the coherent poly(acetylene) films of the present invention have a C=C stretching frequency of 1480 cm$^{-1}$ which may be interpreted as a sequence of more than 25 double bonds per chain whereas the poly(acetylenes) of prior art have a C=C stretching frequency of 1460 cm$^{-1}$ which may be interpreted on the same basis as a sequence of at least 75 double bonds per chain. X-ray diffraction and electron diffraction spectra also show the poly(acetylenes) of the present invention to be of lower crystallinity and hence distinct.

The conductivity of the pristine poly(acetylene) produced according to the present invention is in the range of between $10^{-8}$ and $10^{-5}$ per ohm per cm.

The electrical properties of the poly(acetylene) produced according to the present invention may be altered as desired by addition of suitable dopants known in the art. Examples of dopants include the halogens, fluorides of arsenic, and protonic acids. The dopants may be added either to the solution from which the precursor polymer (V) is cast or to the pre-cast polymer by diffusion thereof from a gas or liquid phase, electrochemical diffusion or by ion implantation techniques. The morphology of the poly(acetylene) produced by the process of the present invention renders it particularly suitable for selective area doping, with a resolution which is better than 1000 Å. In comparison the fibrils in conventionally produced poly(acetylene) give a resolution figure which rises to around 100 microns which is approximately 1000 times larger.

Upon doping, the conductivity of these films can be substantially improved. For instance, by using iodine as dopant the conductivity of the coherent film may be improved to a value of between 1 and 20 per ohm per cm.

The process of producing poly(acetylene) according to the present invention also enables controlled chain-alignment of the molecules in the polymer prior to the transformation reaction. The polymer (V) may be cast on a flexible substrate or in the form of a free-standing film which can be stretched as necessary to provide the desired chain alignment. Alternatively it can be cast from a solution in a shear field to achieve the desired chain alignment.

The process for producing poly(acetylene) according to the present invention is further illustrated with reference to the following Examples.

EXAMPLE 1

A solution of 1 g of the precursor polymer (II) dissolved in 25 ml of acetone was prepared. Approximately 4.5 ml of this solution was cast onto a 3 in. diameter silicon slice and the solvent allowed to evaporate under a reduced pressure of nitrogen (200 mm of Hg pressure) at room temperature (about 25° C.) The pressure was then further reduced to less than 1 mm of Hg pressure, the temperature raised to 80° C., and maintained for 10 hours. The fawn film gave way to a black, shiny film of poly(acetylene). Examination of the film in the scanning electron microscope showed a solid, coherent film of 20±2 microns thickness. The film had a measured density of about 1.0 g/cc. The conductivity was found to be approximately $10^{-6}$ (ohm cm)$^{-1}$.

EXAMPLE 2

A solution of 0.5 g of the precursor polymer (II) dissolved in 25 ml of acetone was prepared. Approximately 0.5 ml of this solution was cast onto a quartz plate and the solvent allowed to evaporate under a nitrogen atmosphere at room temperature. The pressure was then reduced to less than 1 mm of Hg pressure and the sample maintained at room temperature (about 25° C.) for 24 hours. It was then heated up to 80° C. and maintained at that temperature for 15 min before cooling back to room temperature. A film was formed, in which 90% of the precursor polymer had been converted to a coherent polyacetylene film. The conductivity of the film at room temperature was then measured and found to be $3.5 \times 10^{-6}$ (ohm cm)$^{-1}$. The density of the film was about 1.0 g/cc. The sample was then subjected five times, still under vacuum, to a temperature cycle of between 3° C. and 80° C. by heating at the rate of 1° C. per minute to 80° C. and maintaining at that temperature for 20 minutes before cooling down to start the next cycle. It was exposed to iodine vapour and doped to a molar ratio level of 17±4% with respect to the polymer and represented by the empirical formula $(CHI_{0.17})_x$. The conductivity was measured to be 0.1 (ohm cm)$^{-1}$ at 50° C. On examination the thickness of the film was found to be 20±8 microns.

EXAMPLE 3

Example 2 was repeated except that the precursor polymer was heated at 80° C. for 2 hours and the conductivity of the coherent polyacetylene film $(CHI_{0.25})_x$ produced was 15(ohm cm)$^{-1}$ at 23° C.

EXAMPLE 4

A precursor polymer (V) in which $R_1$ and $R_2$ represent a benzene ring and $R_3$ and $R_4$ each represent a hydrogen atom was dissolved in ethyl acetate (0.75 gm/25 ml) and heated at 120° C. for 10 hours to give a coherent poly(acetylene) film.

EXAMPLE 5

Kinetic analyses were carried out on various precursors using a Differential Scanning Calorimeter and software which enabled analysis of the transformation reaction from precursor polymer to a poly(acetylene) film. The data was related to other spectroscopic analyses to optimise the transformation. The data obtained is tabulated below:

TABLE 2

| Substituents in the precursor polymer | | | | Transformation (Heating Rate 2.5° C./min) Temp range | |
|---|---|---|---|---|---|
| $R_1$ | $R_2$ | $R_3$ | $R_4$ | From | To |
| H | H | H | H | 15 | 60 |
| $CF_3$ | $CF_3$ | H | H | 50 | 100 |
| $CO_2CH_3$ | $CO_2CH_3$ | H | H | 50 | 105 |
| benzene ring | | H | H | 90 | 160 |
| benzene ring | | benzene ring | | 180 | 220* |

*Degradation of poly(acetylene) sets in above 200° C.

EXAMPLE 6

A solution of 0.25 g of the precursor polymer (II) dissolved in 25 ml of acetone was prepared. Samples for spectroscopic analysis were prepared in two ways:
(a) Transmission Electron Microscope grids coated with a thin layer of carbon were immersed in the solution, quickly dried and heated at 80° for 2 hours. They were then examined in a Transmission Electron Microscope, by electron diffraction techniques. They showed a diffuse ring in contrast to poly(acetylene) produced by conventional techniques [described by (i) Shirakawa, H. and Ikeda, S., Polymer Journal (1971), Vol 2(2), p 231 and (ii) Luttinger, L. B., Journal of Organic Chemistry, (1962), Vol. 27, p 1591. These films were produced at −78° C. and then isomerised at 150° C. for 5 hours] which show a pattern of sharp rings. This indicates substantially reduced crystallinity for the poly(acetylene) produced according to the present invention.
(b) The precursor polymer was cast from this solution on the inside of a flask. The precursor was transformed at 80° C. for 4 hours.
(c) The sample was examined by Resonance Raman Spectroscopy, whilst still in the flask under vacuum. When irradiated with a laser line of 676.4 nm the sample gave a C═C stretching frequency at 1480 cm$^{-1}$. This compares with a value of 1460 cm$^{-1}$ for poly(acetylene) prepared by conventional techniques, and indicates markedly shorter conjugation lengths.
(d) The film was removed from the flask under nitrogen and examined by X-ray diffraction. The trace obtained showed a broader, less intense peak at higher lattice spacings than those obtained from conventionally produced poly(acetylene) [cf (i) Shirakawa et al and (ii) Luttinger Loc. Cit.]. This confirms the electron diffraction experiment suggesting substantially reduced crystallinity.

EXAMPLE 7

A solution of 0.5 g of the precursor polymer (II) dissolved in 25 ml of deoxygenated acetone was prepared. Approximately 10 ml of this solution was placed inside a round bottom flask. It was spun around the inner surface of the flask by gentle rotation of the latter. This process was continued until all the solvent had evaporated under a nitrogen atmosphere at room temperature. The pressure was then reduced to less than $10^{-3}$ torr as it was heated up to 80° C. and maintained at that temperature for 2 hours before cooling back to room temperature. A film of about 15 microns thick was formed. A portion of this film (5.6 mg by weight) was used for the iodine weight uptake experiments using a quartz-fibre coil spring (extension 1 mm/mg). The diffusion coefficient of iodine in the film thus obtained was approximately $10^{-4} cm^2 s^{-1}$, which corresponds to a geometric resolution of less than 20 microns. In comparison the geometric resolution of the conventionally produced poly(acetylene) [(as described by Berniere, F. et al, in Journal of Physics and Chemistry of Solids, Vol 42, pp 649-654f, (1981)] was higher than 5 mm.

EXAMPLE 8

A solution of 2 gm of the precursor polymer (II) dissolved in 20 ml of acetone was prepared. Approximately 1 ml of this solution was cast onto an aluminium scanning electron microscope stub. The temperature was quickly raised to 150° C. and maintained for 5 hours under a vacuum of 0.01 mm of Hg. The edges of the film became detached from the stub and curled up. One such section was fractured and the broken edge examined. It showed significant voiding.

EXAMPLE 9

A solution of 5 gm of the precursor polymer (II) dissolved in 20 ml of acetone was prepared. It was cast onto a salt-plate and kept under a vacuum of 0.01 mm of Hg at room temperature (approx. 22° C.) for 200 hours. The film appeared lumpy and shrivelled. Infra-red examination of the film showed less than 70% loss of hexafluoroortho-xylene.

EXAMPLE 10

Approximately 5 ml of the precursor polymer solution of Example 7 was cast on a glass slide. It was first evacuated at room temperature under less than $10^{-3}$ torr to remove the solvent (acetone). The sample slide was then sealed onto the sample holder of a Perkin Elmer UV/VIS spectrophotometer. The latter was evacuated to a vacuum of less than $10^{-3}$ torr at 23° C. The sample was yellowish in colour and an optical spectrum (0.5-5.5 eV) was first obtained at 23° C. The absorption edge (ie optical bandgap) of this spectrum was 2.0 eV. The sample was then heated at 65° C. for 5 hours and the optical scanning was repeated every hour. As the appearance of the polymer changed from yellow, through orange, red and brown to eventually black, metallic lustre, the optical bandgap decreased from 2.0 eV to 1.5 eV.

We claim:

1. A coherent poly(acetylene) film, characterized in that said film is a solid film with no voids and with no basic structural units being visible under a scanning electron microscope at a magnification of 10,000 times.

2. A coherent poly(acetylene) film according to claim 1 characterised in that said film has a density of at least 1 g/cc.

3. A coherent poly(acetylene) film according to claim 1 characterised in that said film in pristine form has a conductivity of between $10^{-8}$ and $10^{-5}$ per ohm per cm.

4. A coherent poly(acetylene) film according to claim 1 characterised in that said film has a sequence of no more than 25 conjugated double bonds per chain as determined by resonance Raman Spectroscopy.

* * * * *

UNITED STATES PATENT AND TRADEMARK OFFICE
CERTIFICATE OF CORRECTION

PATENT NO. : 4,496,702
DATED : January 29, 1985
INVENTOR(S) : DAVID C. BOTT et al It is certified that error appears in the above-identified patent and that said Letters Patent is hereby corrected as shown below:

Col. 3, line 11,     "when" should read --then--

Col. 4, line 32,     "of more than" should read --of no more than--

Col. 7, line 8,     "$10^{-4} cm^2 s^{-1}$," should read --$10^{-14} cm^2 s^{-1}$,--

Signed and Sealed this

Eleventh Day of June 1985

[SEAL]

Attest:

DONALD J. QUIGG

Attesting Officer     Acting Commissioner of Patents and Trademarks